R. W. LINDHÉ.
BALL RETAINER FOR BALL BEARINGS.
APPLICATION FILED DEC. 7, 1917.

1,294,127.
Patented Feb. 11, 1919.

WITNESSES:

INVENTOR
Roland Wallace Lindhé
By Attorneys,

UNITED STATES PATENT OFFICE.

ROLAND WALLACE LINDHÉ, OF MOSCOW, RUSSIA, ASSIGNOR TO AKTIEBOLAGET SVENSKA KULLAGERFABRIKEN, OF GOTTENBORG, SWEDEN, A CORPORATION OF SWEDEN.

BALL-RETAINER FOR BALL-BEARINGS.

1,294,127. Specification of Letters Patent. Patented Feb. 11, 1919.

Original application filed March 17, 1917, Serial No. 155,602. Divided and this application filed December 7, 1917. Serial No. 205,941.

*To all whom it may concern:*

Be it known that I, ROLAND WALLACE LINDHÉ, a subject of the King of Sweden, residing at Moscow, in the Republic of Russia, have invented certain new and useful Improvements in Ball-Retainers for Ball-Bearings, of which the following is a specification, reference being had to the drawings accompanying and forming a part thereof.

This invention relates to ball retainers for ball bearings and particularly to ball retainers consisting of two separate rings having holes for the balls and held together by the balls themselves.

This application is divisional of my copending application filed March 17, 1917, Serial No. 155,602, which matured into Letters Patent No. 1,254,332, January 22, 1918.

The invention consists, chiefly, in that the holes in both rings are of smaller diameter than the diameter of the balls, and are open at the sides. The balls inserted between the rings are retained by the seats formed by opposite holes, no other means for securing the balls being required and any risk of jamming the balls being excluded.

The invention further consists in the construction and combination of parts hereinafter described and particularly pointed out in the claims.

Figure 1:
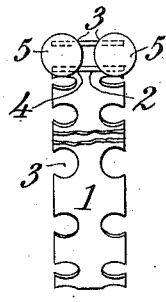
Figure 2:
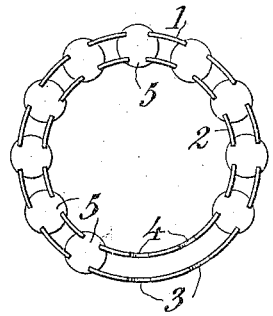

In the drawings, Figure 1 is a side elevation, partly in section, of a ball retainer according to the invention, and Fig. 2 is a plan view thereof.

Referring first to Figs. 1 and 2, the ball retainer consists of two concentric cylindrical rings 1 and 2 having holes 3 and 4, respectively, for the balls 5. According to the invention, the diameter of the holes in both rings is smaller than the diameter of the balls. The balls are open at the sides whereby tongues or laps are formed between which the balls are held. The balls are inserted by making use of the elasticity of the rings.

In the illustration a retainer is shown for two rows or sets of balls, but, of course, it is obvious that the same invention will apply equally well to a retainer for a single row or set of balls.

I claim as my invention:—

1. A ball retainer for ball bearings consisting of two separate rings having holes for the balls and held together by the balls themselves, the said retainer being characterized by this that the holes in both rings are of smaller diameter than the diameter of the balls and are open at the sides of the rings whereby tongues or laps are formed between which the balls are held.

2. A ball retainer for ball bearings consisting of two separate rings each having two rows of holes for the balls, the rings being held together by the balls themselves, said ball retainer being characterized by this that the holes in both rings are of smaller diameter than the diameter of the balls, the rings at each side being cut into the holes adjacent that side whereby tongues or laps are formed between which the balls are held.

In witness whereof I have hereunto signed my name in the presence of two subscribing witnesses.

ROLAND WALLACE LINDHÉ.

Witnesses:
AUG. SORENSON,
KARL RUNESKOG.